US012192728B2

(12) United States Patent
Tong et al.

(10) Patent No.: US 12,192,728 B2
(45) Date of Patent: Jan. 7, 2025

(54) SOUND DEVICE

(71) Applicant: AAC Microtech (Changzhou) Co., Ltd., Changzhou (CN)

(72) Inventors: Dijiang Tong, Shenzhen (CN); Huanbin Liao, Shenzhen (CN); Yajian Zheng, Shenzhen (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 245 days.

(21) Appl. No.: 18/086,691

(22) Filed: Dec. 22, 2022

(65) Prior Publication Data

US 2024/0056739 A1 Feb. 15, 2024

Related U.S. Application Data

(63) Continuation of application No. PCT/CN2022/121717, filed on Sep. 27, 2022.

(30) Foreign Application Priority Data

Aug. 12, 2022 (CN) ......................... 202222131018.8

(51) Int. Cl.
*H04R 9/02* (2006.01)

(52) U.S. Cl.
CPC .......... *H04R 9/025* (2013.01); *H04R 2400/11* (2013.01)

(58) Field of Classification Search
CPC ....... H04R 9/025; H04R 2400/11; H04R 9/06
See application file for complete search history.

(56) References Cited

U.S. PATENT DOCUMENTS

2020/0413171 A1* 12/2020 Shen ...................... H04R 9/025
2022/0174419 A1* 6/2022 Liang ..................... H04R 9/025

* cited by examiner

*Primary Examiner* — Tuan D Nguyen
(74) *Attorney, Agent, or Firm* — W&G Law Group

(57) ABSTRACT

The present disclosure discloses a sound device comprising: a metal frame; a vibration system fixed to metal frame; a magnetic system fixed to metal frame driving the vibration system to vibrate; the magnetic system includes a lower clamp plate, a main magnet fixed to the side of the lower clamp plate near the vibration system, and a sub-magnet set around the main magnet and spaced apart from the main magnet to form a magnetic gap; the sound device also includes a location pin fixed to the lower clamp plate, the location pin is formed on the circumference of the lower clamp plate by injection molding, and the end of the location pin away from the lower clamp plate is attached to the metal frame to form a positioning of the metal frame. The present disclosure can make the lower clamp plate positioned with the metal frame through the location pin, thus avoiding the problem that the lower clamp plate cannot be positioned with the metal frame.

10 Claims, 4 Drawing Sheets

A-A

SOUND DEVICE

FIELD OF THE PRESENT DISCLOSURE

The present disclosure relates to electro-acoustic transducers, especially relates to a sound device.

DESCRIPTION OF RELATED ART

A sound device is a transducer device that converts electrical signals into acoustic signals, which mainly includes a frame, a vibration system fixed to the frame, and a magnetic system fixed to the frame which drives the vibration of the vibration system.

The existing magnetic system includes a lower clamp plate fixed to the frame, a main magnet fixed to the side of the lower clamp plate near the vibration system, and a sub-magnet set around the main magnet and spaced apart from the main magnet to form a magnetic gap, where the lower clamp plate is positioned by a location pin set on the plastic frame.

However, in order to make the frame thinner to reduce the overall volume or increase the sounding cavity space, at this time, the frame will be made of metal into a metal frame, and when the frame is made of metal, it will not be able to set the plastic location pin, which leads to the lower clamp can not be positioned with the metal frame.

Therefore, it is necessary to provide an improved sound device to overcome the problems mentioned above.

SUMMARY OF THE INVENTION

The present disclosure provide a sound device can solve the problem that the metal frame in the existing sound device cannot be set with plastic location pin, and thus the lower clamp plate cannot be positioned with it.

The sound device comprising: a metal frame; a vibration system fixed to metal frame; a magnetic system fixed to metal frame driving the vibration system to vibrate; the magnetic system includes a lower clamp plate, a main magnet fixed to the side of the lower clamp plate near the vibration system, and a sub-magnet set around the main magnet and spaced apart from the main magnet to form a magnetic gap; the sound device also includes a location pin fixed to the lower clamp plate, the location pin is formed on the circumference of the lower clamp plate by injection molding, and the end of the location pin away from the lower clamp plate is attached to the metal frame to form a positioning of the metal frame.

Further, the magnetic system further comprises an upper clamp plate covered with the sub-magnet, the upper clamp plate is fixedly connected to the metal frame; the location pin is attached to the upper clamp plate to indirectly form the positioning of the metal frame.

Further, the upper clamp plate is provided with a positioning gap, and the location pin extends to the positioning gap to be positioned against the upper clamp plate.

Further, the metal frame and the upper clamp plate are one-piece molded structure.

Further, the metal frame includes a rectangular ring with a main part including two long side parts and two short side parts provided opposite and spaced apart; the upper clamp plate includes two first upper clamp plates and is formed by the central area of the two short side parts respectively extending inward, the two first upper clamp plates are stacked on the two sub-magnets located on the short axis side of the main magnet; the positioning gap includes four and is formed by the two first upper clamp plates respectively near the sides of the two long side parts recessed inward, the location pin includes four and extend to the four positioning gaps one by one.

Further, the upper clamp plate further comprises two second upper clamps formed by the central region of each of the two long side parts extending inwardly, the two second upper clamps being stacked on the two sub-magnets located on the long axis side of the main magnet.

Further, the vibration system includes a diaphragm fixed to the metal frame, a coil inserted and suspended in the magnetic gap to drive the vibration of the diaphragm, a bracket fixed to the diaphragm and electrically connected to the coil, and a flexible member fixed to the metal frame and set opposite to the diaphragm and spaced apart, and the flexible member is electrically connected to the bracket.

Further, the bracket includes a bracket body fixed to the diaphragm and in the shape of a ring, and a bracket fixing part formed by bending the outer peripheral edge of the bracket body in the direction close to the magnetic system; the flexible member is connected to the side of the bracket fixing part away from the bracket body, and the coil is connected to the side of the bracket body close to the magnetic system.

Further, the diaphragm includes a folded ring part, a vibration part bent and extended from the inner peripheral edge of the folded ring part and fixed to the outer peripheral edge of the bracket body, a fixing part bent and extended from the outer peripheral edge of the folded ring part and fixed to the metal frame, and a dome fixed to the inner peripheral edge of the bracket body.

Further, the flexible members include four and are fixed to the four corner positions of the metal frame, and the bracket fixing part includes four and is connected to the four flexible members respectively; each flexible member includes a first fixing arm fixed to the metal frame, a second fixing arm fixed to the bracket fixing part and spaced from the first fixing arm, and a flexible arm bent from the first fixing arm to the second fixing arm and connected to the second fixing arm.

Compared to related arts, the sound device in the present disclosure forms a location pin by injection molding on the circumference of the lower clamp plate, and makes the end of the location pin away from the lower clamp plate against the metal frame, thus forming a positioning of the metal frame and avoiding the problem that the lower clamp plate cannot be positioned with the metal frame.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

In the figures, 100 denotes sound device, 1 denotes metal frame, 11 denotes long side part, 12 denotes short side part, 2 denotes vibration system, 21 denotes diaphragm, 211 denotes folded ring part, 212 denotes vibration part, 213 denotes fixing part, 214 denotes dome, 22 denotes coil, 23 denotes bracket, 231 denotes bracket body, 232 denotes bracket fixing part, 24 denotes flexible member, 241 denotes first fixing arm, 242 denotes second fixing arm, 2421 denotes first connection part, 2422 denotes second connection part, 2423 denotes third connection part, 243 denotes flexible arm, 3 denotes magnetic system, 31 denotes lower clamp plate, 311 denotes location pin, 32 denotes main magnet, 33 denotes sub-magnet, 331 denotes first sub-magnet, 332 denotes second sub-magnet, 34 denotes upper clamp plate, 341 denotes positioning gap, 342 denotes first upper clamp plate, 343 denotes second upper clamp plate, 35 denotes pole core, 10 denotes vocal cavity, 20 denotes magnetic gap.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
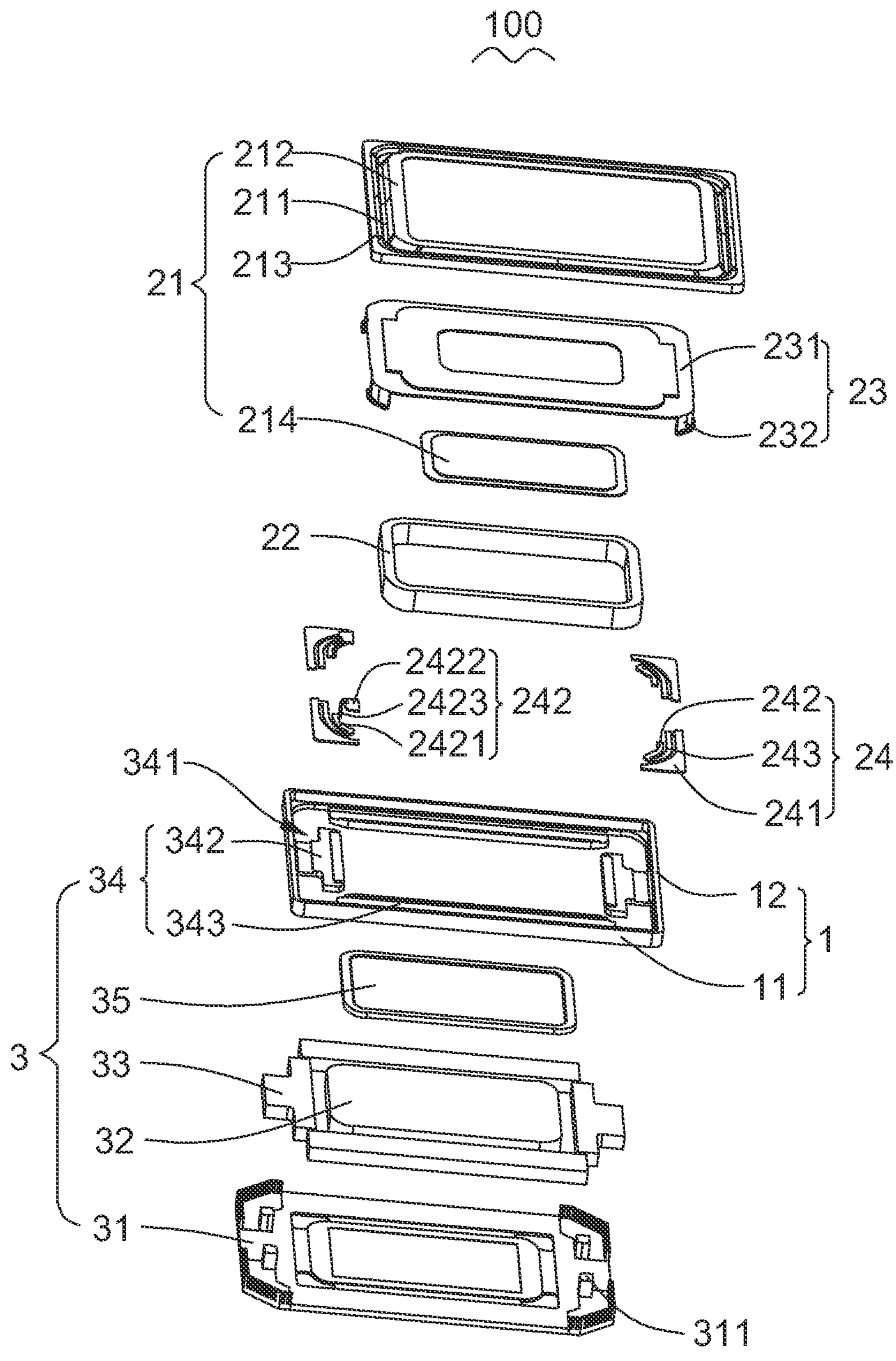
FIG. 1 is an exploded view of a sound device of the present disclosure.
Figure 2:
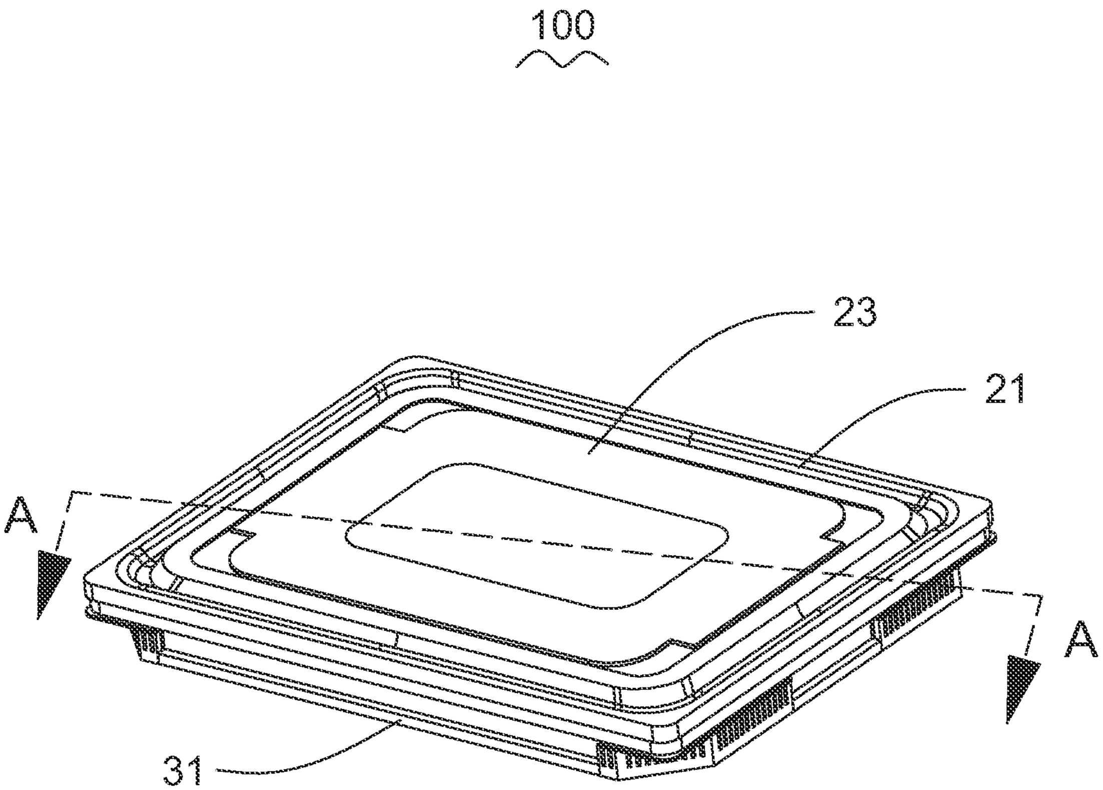
FIG. 2 is a structure schematic of the sound device of the present disclosure.
Figure 3:
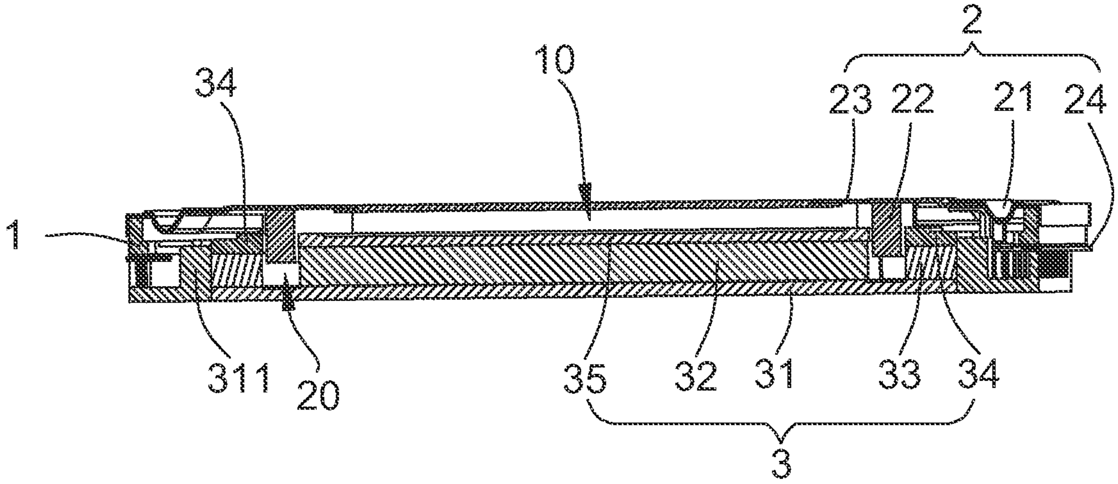
FIG. 3 is a cross-sectional view of the sound device taken along line A-A in FIG. 2.
Figure 4:
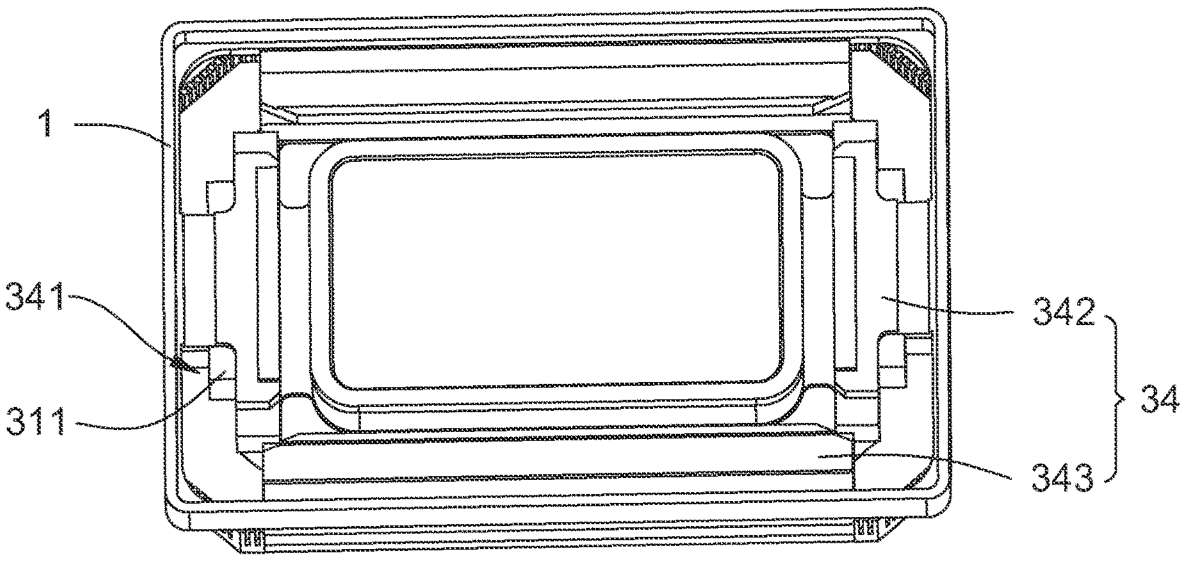
FIG. 4 is a schematic diagram of the connection structure between the metal frame and the magnetic system of the present disclosure.

Please refer to FIGS. 1-4 together, a sound device 100 provided by an exemplary embodiment of the present disclosure includes a metal frame 1, a vibration system 2 and a magnetic system 3 fixed to metal frame 1 respectively. Magnetic system 3 drives vibration system 2 to vibrate. Among them, the metal frame 1, vibration system 2 and magnetic system 3 together to enclose the vocal cavity 10.

Specifically, the magnetic system 3 includes a lower clamp plate 31, a main magnet 32 fixed to the side of the lower clamp plate 31 near the vibration system 2, and a sub-magnet 33 set around the main magnet 32 and spaced apart from the main magnet 32 to form a magnetic gap 20.

Specifically, the sound device 100 also includes a location pin 311 fixed to the lower clamp plate 31, the location pin 311 is formed on the circumference of the lower clamp plate 31 by injection molding, and the end of the location pin 311 away from the lower clamp plate 31 is attached to the metal frame 1 to form a positioning of the metal frame 1.

Further, the magnetic system 3 further comprises an upper clamp plate 34 covered with the sub-magnet 33, the upper clamp plate 34 is fixedly connected to the metal frame 1; the location pin 311 is attached to the upper clamp plate 34 to indirectly form the positioning of the metal frame 1.

In this embodiment, the upper clamp plate 34 is provided with a positioning gap 341, and the location pin 311 extends to the positioning gap 341 to be positioned against the upper clamp plate 34. This allows the location pin 311 to be more stably connected to the upper clamp plate 34, thereby achieving positioning fixation.

In this embodiment, the metal frame 1 and the upper clamp plate 34 are one-piece molded structure. This enhances the structural strength of the two connections.

Further, the magnetic system 3 further comprises a pole core 35 stacked on the side of the main magnet 32 near the vibration system 2.

Specifically, the vibration system 2 includes a diaphragm 21 fixed to the metal frame 1, a coil 22 inserted and suspended in the magnetic gap 20 to drive the vibration of the diaphragm 21, a bracket 23 fixed to the diaphragm 21 and electrically connected to the coil 22, and a flexible member 24 fixed to the metal frame 1 and set opposite to the diaphragm 21 and spaced apart, and the flexible member 24 is electrically connected to the bracket 23.

In this embodiment, the metal frame 1 includes a rectangular ring with a main part including two long side parts 11 and two short side parts 12 provided opposite and spaced apart. The upper clamp plate 34 includes two first upper clamp plates 342 and is formed by the central area of the two short side parts 12 respectively extending inward, the two first upper clamp plates 342 are stacked on the two sub-magnets 33 located on the short axis side of the main magnet 32; the positioning gap 341 includes four and is formed by the two first upper clamp plates 342 respectively near the sides of the two long side parts 11 recessed inward, the location pin 311 includes four and extend to the four positioning gaps 341 one by one. By the positioning cooperation of the four location pins 311 and the four positioning gaps 341, the positioning between the lower clamp plate 31 and the upper clamp plate 34 can be made more stable.

In addition, the upper clamp plate 34 further comprises two second upper clamps 343 formed by the central region of each of the two long side parts 11 extending inwardly, the two second upper clamps 343 being stacked on the two sub-magnets 33 located on the long axis side of the main magnet 32.

In this embodiment, the sub-magnets 33 include four, and the two sub-magnets 33 located on the short axis side of the main magnet 32 have the same structure as the two first upper clamp plates 342, respectively, and the two sub-magnets 33 located on the long axis side of the main magnet 32 have the same structure as the two second upper clamp plates 343, respectively.

In this embodiment, the lower clamp plate 31 is a rectangular structure, and the four location pins 311 are set at the four corner positions of the lower clamp plate 31.

In this embodiment, the bracket 23 includes a bracket body 231 fixed to the diaphragm 21 and in the shape of a ring, and a bracket fixing part 232 formed by bending the outer peripheral edge of the bracket body 231 in the direction close to the magnetic system 3. The flexible member 24 is connected to the side of the bracket fixing part 232 away from the bracket body 231, and the coil 22 is connected to the side of the bracket body 231 close to the magnetic system 3.

In this embodiment, the diaphragm 21 includes a folded ring part 211, a vibration part 212 bent and extended from the inner peripheral edge of the folded ring part 211 and fixed to the outer peripheral edge of the bracket body 231, a fixing part 213 bent and extended from the outer peripheral edge of the folded ring part 211 and fixed to the metal frame 1, and a dome 214 fixed to the inner peripheral edge of the bracket body 231.

Wherein, the vibration part 212 is fixed to the side of the bracket body 231 away from the magnetic system 3 and the dome 214 is fixed to the side of the bracket body 231 near the magnetic system 3.

In this embodiment, the flexible members 24 include four and are fixed to the four corner positions of the metal frame 1, and the bracket fixing part 232 includes four and is connected to the four flexible members 24 respectively; each flexible member 24 includes a first fixing arm 241 fixed to the metal frame 1, a second fixing arm 242 fixed to the bracket fixing part 232 and spaced from the first fixing arm

241, and a flexible arm 243 bent from the first fixing arm 241 to the second fixing arm 242 and connected to the second fixing arm 242.

The first fixing arm 241 is indirectly fixed to the metal frame 1 through the lower clamp plate 31, equivalent to, the first fixing arm 241 is overhanging and fixed to the four corner positions of the lower clamp plate 31.

In this embodiment, each of the second fixing arms 242 of two of the adjacent flexible members 24 includes a first connection part 2421 connected to the bracket fixing part 232, a second connection part 2422 connected to the side of the bracket body 231 near the magnetic system 3, and a third connection part 2423 extending from the first connection part 2421 to the second connection part 2422 and connected to the second connection part 2422.

Compared with related technology, the sound device 100 of the present disclosure forms a location pin 311 by injection molding the circumference of the lower clamp plate 31 and making the end of the location pin 311 away from the lower clamp plate 31 against the metal frame 1, thus forming a positioning of the metal frame 1 and avoiding the problem that the lower clamp plate 31 cannot be positioned with the metal frame 1.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sound device comprising:
- a metal frame;
- a vibration system fixed to metal frame;
- a magnetic system fixed to metal frame driving the vibration system to vibrate;
- the magnetic system includes a lower clamp plate, a main magnet fixed to the side of the lower clamp plate near the vibration system, and a sub-magnet set around the main magnet and spaced apart from the main magnet to form a magnetic gap;
- the sound device also includes a location pin fixed to the lower clamp plate, the location pin is formed on the circumference of the lower clamp plate by injection molding, and the end of the location pin away from the lower clamp plate is attached to the metal frame to form a positioning of the metal frame.

2. The sound device as described in claim 1, wherein the magnetic system further comprises an upper clamp plate covered with the sub-magnet, the upper clamp plate is fixedly connected to the metal frame; the location pin is attached to the upper clamp plate to indirectly form the positioning of the metal frame.

3. The sound device as described in claim 2, wherein the upper clamp plate is provided with a positioning gap, and the location pin extends to the positioning gap to be positioned against the upper clamp plate.

4. The sound device as described in claim 3, wherein the metal frame and the upper clamp plate are one-piece molded structure.

5. The sound device as described in claim 4, wherein the metal frame includes a rectangular ring with a main part including two long side parts and two short side parts provided opposite and spaced apart; the upper clamp plate includes two first upper clamp plates and is formed by the central area of the two short side parts respectively extending inward, the two first upper clamp plates are stacked on the two sub-magnets located on the short axis side of the main magnet; the positioning gap includes four and is formed by the two first upper clamp plates respectively near the sides of the two long side parts recessed inward, the location pin includes four and extend to the four positioning gaps one by one.

6. The sound device as described in claim 5, wherein the upper clamp plate further comprises two second upper clamps formed by the central region of each of the two long side parts extending inwardly, the two second upper clamps being stacked on the two sub-magnets located on the long axis side of the main magnet.

7. The sound device as described in claim 6, wherein the vibration system includes a diaphragm fixed to the metal frame, a coil inserted and suspended in the magnetic gap to drive the vibration of the diaphragm, a bracket fixed to the diaphragm and electrically connected to the coil, and a flexible member fixed to the metal frame and set opposite to the diaphragm and spaced apart, and the flexible member is electrically connected to the bracket.

8. The sound device as described in claim 7, wherein the bracket includes a bracket body fixed to the diaphragm and in the shape of a ring, and a bracket fixing part formed by bending the outer peripheral edge of the bracket body in the direction close to the magnetic system; the flexible member is connected to the side of the bracket fixing part away from the bracket body, and the coil is connected to the side of the bracket body close to the magnetic system.

9. The sound device as described in claim 8, wherein the diaphragm includes a folded ring part, a vibration part bent and extended from the inner peripheral edge of the folded ring part and fixed to the outer peripheral edge of the bracket body, a fixing part bent and extended from the outer peripheral edge of the folded ring part and fixed to the metal frame, and a dome fixed to the inner peripheral edge of the bracket body.

10. The sound device as described in claim 8, wherein the flexible members include four and are fixed to the four corner positions of the metal frame, and the bracket fixing part includes four and is connected to the four flexible members respectively; each flexible member includes a first fixing arm fixed to the metal frame, a second fixing arm fixed to the bracket fixing part and spaced from the first fixing arm, and a flexible arm bent from the first fixing arm to the second fixing arm and connected to the second fixing arm.

* * * * *